Patented Aug. 6, 1935

2,010,512

UNITED STATES PATENT OFFICE 2,010,512

ANTISEPTIC

Joseph Ebert, Westmont, N. J., assignor to The Farastan Company, Philadelphia, Pa., a corporation of Pennsylvania No Drawing. Application December 5, 1932, Serial No. 645,859

11 Claims. (Cl. 167—65)

This invention relates to antiseptics for internal or external use. More particularly, it relates to non-toxic antiseptics for the treatment of infectious ailments of the urinary tract.

There are certain non-toxic compounds such as ortho-hydroxy-quinoline sulfate which have valuable antiseptic properties but which have not been available for the treatment of infections in the urinary tract such as gonorrheal infections, mixed infections, pyelitis, etc., because when administered orally only a small part is eliminated in the urine. I have found that a mixture valuable for the treatment of such infections may be formed by mixing with such an antiseptic a substance of colloidal behavior which is normally eliminated, at least to a large extent, through the urinary tract as a finely divided suspension and which mixed with the antiseptic causes appreciably more than the usual amount of the antiseptic to be eliminated in the urine. Antiseptic mixtures intended for oral administration must necessarily be non-toxic and I prefer mixtures which are non-staining and which have no more than a slight effect on the color of the urine. I have developed a series of yellow, brown or slightly reddish disazo compounds which are non-toxic and non-staining and exhibit certain colloidal properties and which on admixture with ortho-hydroxy-quinoline sulfate or other ortho-hydroxy-quinoline salts cause them to be eliminated in the urine, and I consider such mixtures a preferred form of my invention because these disazo compounds are of themselves antiseptic, and on admixture with antiseptics such as ortho-hydroxy-quinoline sulfate produce a mixture having greater antiseptic properties than either the disazo compound or the sulfate alone.

When such a mixture is administered orally, it passes from the stomach to the intestines and then is absorbed by the blood stream from whence it passes from the kidneys to the urinary tract. The mixture is, therefore, valuable not only in the oral treatment of infections of the intestines, but generally in infectious ailments of the urinary tract such as gonorrhoea, mixed infections, pyelitis, etc.

These disazo compounds are characterized by their very low solubility in water, in alkaline fluids and in weakly acid fluids and by their colloidal behavior. In the intestinal tract the sodium salts of the disazo compounds remain unchanged and undissolved, while the ortho-hydroxy-quinoline salts are converted to the free base. Due to their colloidal properties the disazo compounds are no doubt absorbed by the blood-stream and due to their insolubility they are in contact with the bloodstream a longer period of time than a compound of higher solubility. It is probably due to this and to the fact that the finely subdivided disazo compound may well have a fixative effect on the hydroxy-quinoline salt that a mixture of the disazo compound and a hydroxy-quinoline salt produces a higher bacteriostatic effect than either alone and has a higher therapeutic efficiency.

The action of these disazo compounds on the ortho-hydroxy-quinoline salts producing highly antiseptic mixtures which are largely eliminated through the urinary tract make such mixtures valuable in stopping growth of bacteria in the intestinal as well as in the urinary tract, antibodies being set up which with the material being eliminated through the urinary system remove bacteria thus removing the infection.

It is known that the sulfate of ortho-hydroxy-quinoline has slight bactericidal and bacteriostatic action. Its bactericidal action is only feeble being 1 to 100 against Staphylococcus aureus tested by the Reddish method. Tested against the same organism, its bacteriostatic action is 1 to 10,000. Diphenyl-disazo-ortho-ethoxy-aminophenol-aminobenzoic sodium,

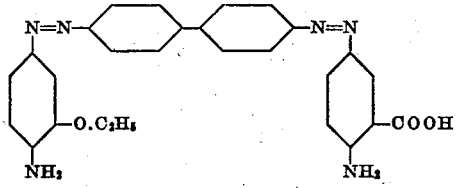

tested in vitro against Staphylococcus aureus shows a completed bactericidal effect in ten minutes in a dilution of 1:2000 and substantially equal bacteriostatic strength. It is practically insoluble in water. It is of yellowish-brown color and shows a remarkable colloidal behavior. On mixing it with an equal part by weight of ortho-hydroxy-quinoline sulfate the bacteriostatic value of the mixture increased one hundred times tested against the same organism and had a bacteriostatic value of 1:10,000 against Bacillus coli.

Bacteriostatic tests were carried out in the presence of nutrient broth alone and in mixture with twenty percent. normal horse serum and twenty percent. filtered human urine. A stock solution of 1:100 of the 1:1 mixture of this disazo compound and ortho-hydroxy-quinoline sulfate was prepared. This solution was diluted with sterile distilled water and further diluted with the nutrient broth to the final dilution. Tests were carried out with the broth alone and the broth containing either twenty percent. normal horse serum or twenty percent filtered human urine. The following organisms were added to separate lots of the broth or the broth mixtures and used as the test micro-organisms, Staphylococcus aureus, streptococcus viridans, pneumococcus, B. coli and B. diphtheroid. One cc. of a 24 hour broth culture of the above microorganisms was added to each 100 cc. of the nutrient broth or nutrient broth plus horse serum or urine mixture.

All tests were conducted in test tubes and the compound so diluted that when 1 cc. was placed in each tube and 9 cc. of the broth suspension of the micro-organism added, the final dilution was the desired one, as recorded in the tests outlined below. All tests were incubated for five days at 37.5° C. and the three highest dilutions showing no growth subcultured. The subcultures were incubated for 48 hours and the results recorded.

Interpretation: In nutrient broth alone (pH 6.8) and in nutrient broth plus twenty percent. normal horse serum (pH 6.8) and in nutrient broth plus twenty percent. normal urine (pH 6.6) the 1:1 mixture was found bacteriostatic to:

Staph. pyog. aureus in dilution of____ 1:150,000
Streptococcus viridans dilution of___ 1:150,000
Pneumococcus in a dilution of_____ 1:150,000
Bacillus coli in a dilution of_____ 1:8,000
Bacillus diphtheroid in a dilution of__ 1:10,000

The mixture is excreted in the urine of substantially normal color but can be detected in the urine or feces by chemical tests. Addition of strong hydrochloric acid produces the hydrochloride of the dye which is a more or less deep wine-red color, depending upon the amount of the disazo compound present. The hydroxyquinoline may be detected by making the urine alkaline with sodium hydroxide, the free base forming a voluminous precipitate. The disazo compound is converted in the stomach into its hydrochloride, the extent depending on the acidity of the gastric juice. The hydroxy-quinoline sulfate passes through the stomach unchanged. The hydrochloride is reconverted in the intestinal tract into its sodium salt while the hydroxyquinoline sulfate is changed to its free base, both reactions depending on the degree of alkalinity of the intestinal juice. The average duration of elimination is 48 hours. From eighty-four to ninety-two percent. of the compound ingested is eliminated in the urine and eight to ten percent. in the feces.

I prefer to administer the mixture in capsules each containing 0.2 gram of substance, the disazo compound and hydroxy-quinoline sulfate being in equal proportions. One 0.2-gram capsule, three times daily, has produced a favorable response in the treatment of gonorrheal and nonspecific urethritis and their complications. A preliminary clinical report is included in the article published in The Illinois Medical Journal for August 1932, pages 144-151.

I have tested many disazo compounds with many different ortho-hydroxy-quinoline salts and without exception have found that a mixture of the two has a higher bacteriostatic value than either alone, and in many instances the bactericidal value of such a mixture is larger, often much larger, than the bactericidal value of either alone. The disazo compounds thus tested are described and claimed in my copending application, Serial No. 569,119, filed October 15, 1931, but I do not consider my invention limited to the compounds there described.

The compounds of that application may be formed by coupling a disazotized diamine nucleus with a substituted aromatic amine and a substituted aromatic carboxylic acid. The substituted aromatic amine may be either an alkoxy amine or a diamine such as

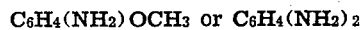

$C_6H_4(NH_2)OCH_3$ or $C_6H_4(NH_2)_2$

The substituted aromatic carboxylic acid may be an aromatic hydroxy carboxylic acid or an aromatic amino carboxylic acid such as $C_6H_4(OH)COOH$ or $C_6H_4(NH_2)COOH$ It may contain both an amino group and a hydroxy group such as $C_6H_3.NH_2(OH)COOH$ It may contain other substituents such as $C_6H_3.CH_3(OH)COOH$ The nucleus of the disazo compound may be a phenyl residue, a diphenyl residue or a diphenyl methane residue. The residue may contain alkyl or alkoxy constituents, for example:

—N=N—C₆H₃.CH₃—N=N—,
—N=N—C₆H₃.OCH₃—C₆H₃.OCH₃—N=N— or
—N=N—C₆H₃.OC₂H₅—CH₂—C₆H₃.OC₂H₅—N=N—.

Antiseptics with which I have mixed such disazo compounds to form mixtures which are largely eliminated in the urine and which have a much greater bacteriostatic value than either of the constituents of the mixture alone include orthohydroxy-quinoline sulfate and other salts of ortho-hydroxy-quinoline described and claimed in my copending application, Serial No. 638,915. Methods of preparing these ortho-hydroxy-quinoline salts are there given. I may, for example, employ the succinate which may be prepared by dissolving 7.3 parts by weight of ortho-hydroxyquinoline base in 50 parts by volume of ethyl or methyl alcohol, and a solution of six parts by weight of succinic acid in 30 parts by volume of ethyl or methyl alcohol added. The solvent may then be evaporated or distilled off and the succinate obtained as bright yellow crystals. The cinnamate may be prepared by dissolving 7.3 parts by weight of ortho-hydroxy-quinoline base and 7.4 parts by weight of cinnamic acid in 75 parts by volume of toluene and boiling for approximately 3 hours under a reflux condenser. The cinnamate is then obtained by distilling off the solvent. Similarly, other salts may be obtained by dissolving ortho-hydroxy-quinoline base and an acid in a solvent to effect the combination of the acid with the base.

A preferred embodiment of this invention is a mixture comprising equal parts of ortho-hydroxyquinoline sulfate and the sodium salt of di phenyl-disazo-ortho-ethoxyamino-phenol-orthoamino-benzoic acid. This disazo compound may be made as follows:

18.6 parts by weight of benzidine are heated with 80 parts of concentrated hydrochloric acid (or the corresponding amount of benzidine hydrochloride may be used), and the resulting hydrochloride is dissolved or suspended in approximately 250 parts of water. The solution is disazotized with a solution of 14.2 parts of sodium nitrite in 60 parts of water keeping the temperature at approximately 15° C. This disazo solution is then coupled with a solution of 14 parts of orthophenetidine in 12 parts of concentrated hydrochloric acid and 150 parts of water, mixed with a solution of 14 parts of ortho-amino benzoic acid in 12 parts of concentrated hydrochloric acid and 100 parts of water. The coupling is carried out at a temperature of 15 to 25° C. The solution is then made alkaline by the addition of 10 to 20% sodium hydroxide solution. The sodium salt of the new disazo compound separates out as a yellow brown precipitate. This precipitate is washed with water until free from chloride and then dried. The compound is purified by recrystallization from ethyl alcohol.

By mixing two parts of the sodium salt of this disazo compound with one part of ortho-hydroxy-quinoline sulfate, a mixture was obtained which had a bacteriostatic value several times that of ortho-hydroxy-quinoline sulfate alone. By mixing two parts of the sodium salt of this disazo compound with three parts of ortho-hydroxy-quinoline sulfate, a mixture was obtained which also had a bacteriostatic value several times that of ortho-hydroxy-quinoline sulfate alone. The hydrochloride of this disazo compound mixed with an equal amount of ortho-hydroxy-quinoline sulfate also gave a mixture having a bacteriostatic value several times that of ortho-hydroxy-quinoline sulfate alone, but the bacteriostatic value of this mixture was not quite equal to that produced from the sodium salt. The mixture of equal parts of the sodium salt and ortho-hydroxy-quinoline sulfate had several times the bacteriostatic value of any of the other mixtures referred to in this paragraph.

Mixtures of other disazo compounds with ortho-hydroxy-quinoline sulfate all of which had a higher bacteriostatic value than either compound alone were made up from equal parts of ortho-hydroxy-quinoline sulfate and the sodium salt of each of the following compounds:

Diphenyl-disazo-o-ethoxyaminophenol-o-hydroxy-benzoic acid,

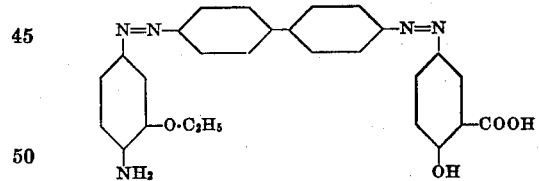

Diphenyl-disazo-o-ethoxyaminophenol amino-hydroxy-benzoic acid,

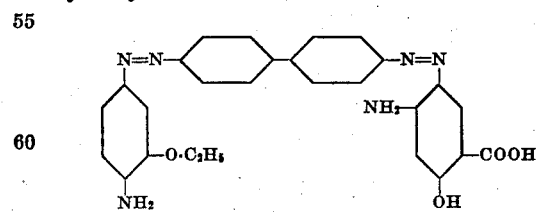

Diphenyl-disazo-o-methoxyamino phenol-amino-benzoic acid,

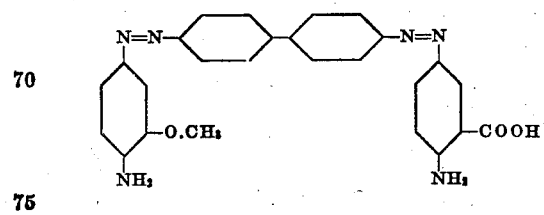

Diphenyl-disazo-diaminobenzene-o-amino-benzoic acid,

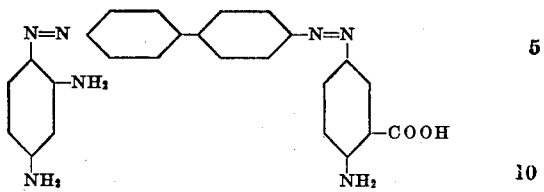

Dimethoxy-diphenyl-disazo-o-ethoxy-aminophenol-o-amino benzoic acid,

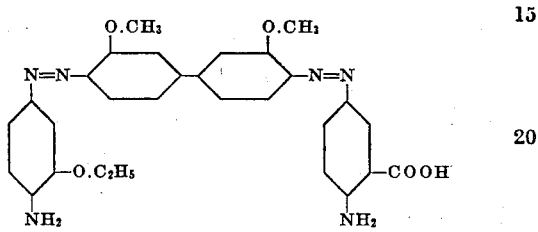

Benzene-disazo-o-ethoxy-aminophenol-o-aminobenzoic acid.

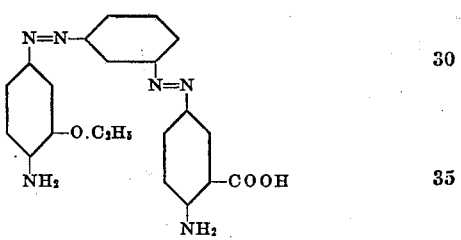

Toluene-disazo-o-ethoxy-aminophenol-o-aminobenzoic acid,

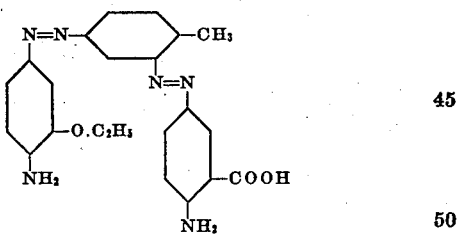

Diphenyl methane disazo-o-ethoxy-aminophenol-o-amino benzoic acid,

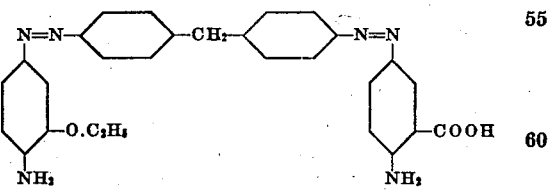

Ditolyl disazo-o-ethoxy-aminophenol-o-aminobenzoic acid,

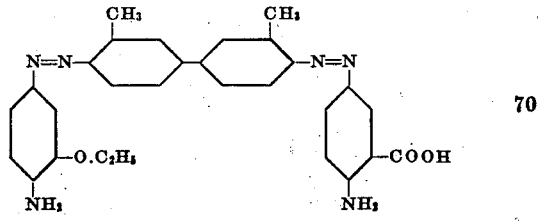

Toluene-disazo-diamino-benzene-o-hydroxy-benzoic acid,

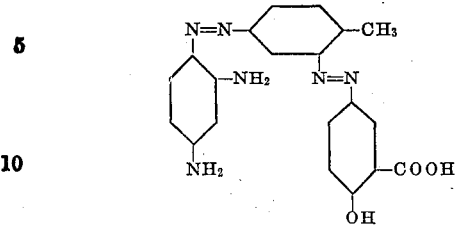

Diphenyl methane-disazo-diamino-hydroxy-benzoic acid,

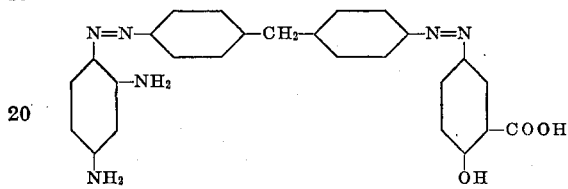

Diphenyl methane-diethoxy-disazo-o-ethoxy-amino-phenol-amino-hydroxy-benzoic acid,

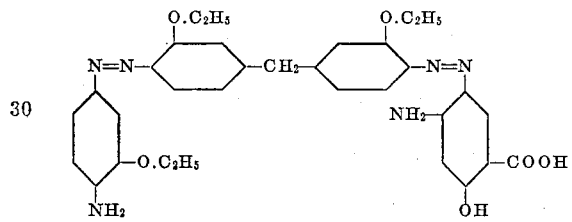

Diphenyl methane-diethoxy-disazo-diamino-benzene-o-amino-benzoic acid,

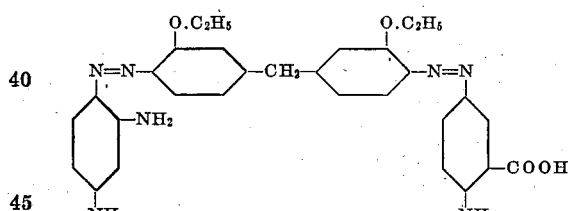

Each of these compounds may be made by disazotizing the appropriate diamine and then coupling with two different aromatic compounds, one of which is a diamine or alkoxy amine and the other of which is a hydroxy or amino carboxylic acid or an aminohydroxy carboxylic acid. The compounds are non-toxic. They contain no nitro, sulfonic, chlorine, bromine or iodine groups. In general, they are yellow to brown or red in color and have a bactericidal value of at least 1 to 1500 and a bacteriostatic value of at least 1 to 2,000.

The alkali salts of the disazo compounds are practically insoluble in water. The hydrochlorides and sulfates are more or less freely soluble. The alkali salts of the disazo compounds, their hydrochlorides, their sulfates or the free bases may be used for admixture with ortho-hydroxy-quinoline sulfate as all form a fine suspension of the alkali salt in the intestinal tract.

In general, the disazo compounds referred to herein, which on solution or suspension have a high pH value (alkaline), on mixing with ortho-hydroxy-quinoline sulfate yield mixtures with a higher bacteriostatic value than mixtures made from disazo compounds having a lower pH value (acid). The solubility appears to increase with the decrease in pH value. This behavior may be explained by the fact that the compounds with a higher degree of solubility (low pH value) are obviously eliminated faster than the compounds with lower solubility (high pH value), and the latter are therefore in contact with the blood stream and with the seat of the infection longer and, therefore, are better able to exert their antiseptic action.

Mixtures of disazo compounds with other ortho-hydroxy-quinoline salts which have a higher bacteriostatic value than either of the compounds alone have been prepared by mixing the sodium salt of diphenyl-disazo-o-ethoxy-aminophenol-o-amino-benzoic acid with the following ortho-hydroxy-quinoline salts: the hydrochloride, the hydrobromide, the mono-phosphate, the oxy-oleate, the acid tartrate, the mono-citrate, the ortho-hydroxy-benzoate, the para-hydroxy-benzoate, the acetylsalicylate, the ortho-amino-benzoate, the gallate, the normal phthalate, the ortho-phenol-sulfate, the sulfanilate, the sulfosalicylate and the beta-naphthalene sulfonate. But I prefer to use equal mixtures of this disazo compound with the ortho-hydroxy-quinoline hydriodide, oleate, succinate, benzoate, cinnamate, acid phthalate, benzene sulfonate, diethyl barbiturate or sulfate each of which mixtures has a high bacteriostatic value of at least about 1 to 200,000, the highest being about 500,000.

I have mixed equal parts of the sodium salt of diphenyl disazo-ortho-ethoxy-aminophenol-ortho-hydroxybenzoic acid separately with the hydriodide, succinate, benzoate, cinnamate, acid phthalate and benzene sulfonate of ortho-hydroxy-quinoline, and in each case I have obtained a mixture having a bacteriostatic value of at least 1 to 300,000 and a bactericidal value of at least 1 to 15,000. I obtained mixtures having a bacteriostatic value of at least 1 to 150,000 by mixing the sodium salt of diphenyl-diazo-ortho-ethoxy-aminophenol-amino-hydroxy-benzoic acid with the hydriodide, oleate, acid tatrate, cinnamate and sulfosalicylate of ortho-hydroxy-quinoline, and also by mixing the sodium salt of diphenyl disazo-ortho-methoxy-amino-phenol-ortho-aminobenzoic acid with the hydrochloride, mono-phosphate, benzoate, ortho-hydroxy-benzoate, cinnamate and sulfanilate of ortho-hydroxy-quinoline. Other disazo compounds mixed with various ortho-hydroxy-quinoline salts and yielding antiseptic mixtures of higher bacteriostatic value than either the disazo compound of the ortho-hydroxy-quinoline salt alone include the sodium salts of diphenyl disazo-diaminobenzene-o-aminobenzoic acid, dimethoxy diphenyl-disazo-o-ethoxy-aminophenol-o-amino-benzoic acid, ditolyl-disazo-o-ethoxy-aminophenol-o-aminobenzoic acid, benzene-disazo-o-ethoxy-aminophenol-o-aminobenzoic acid, toluene-disazo-o-ethoxy-aminophenol-o-aminobenzoic acid and diphenyl-methane disazo-o-ethoxy-aminophenol-o-aminobenzoic acid.

The bactericidal value of each of these mixtures is satisfactorily high, being in some instances as much as 1 to 15,000 or 20,000. I prefer to employ mixtures having a bactericidal value of at least about 1 to 10,000 and a bacteriostatic value of at least 1 to 150,000 or 200,000.

The mixtures of this invention are useful as general antiseptics for internal and external therapy.

This is in part a continuation of my application, Serial No. 584,899, filed January 5, 1932.

I claim:

1. A mixture of an ortho-hydroxy-quinoline salt and a disazo antiseptic compound in which the end components are at least di-substituents and of which one end component is the nucleus of an aromatic amine of the benzene series and the other end component is the nucleus of a carboxylic acid of the benzene series, said mixture being an antiseptic characterized by comparatively low toxicity and useful in the internal and external treatment of infectious diseases.

2. An antiseptic comprising an ortho-hydroxyquinoline salt and a disazo compound formed by coupling a disazotized diamine nucleus with a substituted aromatic amine and a substituted aromatic carboxylic acid, the substituents not including inorganic residues.

3. An antiseptic comprising an ortho-hydroxyquinoline salt and the sodium salt of diphenyl-disazo-ortho-ethoxy-aminophenol-ortho-aminobenzoic acid.

4. An antiseptic comprising an ortho-hydroxyquinoline salt and a disazo compound having the general formula $R'-N=N-R-N=N-R''$ where R is a phenyl residue, a diphenyl residue or a diphenyl methane residue, $R'$ is an aromatic diamine and $R''$ is an amino carboxylic acid or an amino carboxylate.

5. An antiseptic comprising an ortho-hydroxyquinoline salt and a disazo compound having the general formula $R'-N=N-R-N=N-R''$ where R is a phenyl residue, a diphenyl residue or a diphenyl methane residue, $R'$ is an alkoxy aromatic amine and $R''$ is an amino carboxylic acid or an amino carboxylate.

6. An antiseptic comprising an ortho-hydroxyquinoline salt and a disazo compound having the general formula $R'-N=N-R-N=N-R''$ where R is a phenyl residue, a diphenyl residue of a diphenyl methane residue, $R'$ is an aromatic diamine and $R''$ is an hydroxy carboxylic acid or an hydroxy carboxylate.

7. An antiseptic comprising an ortho-hydroxyquinoline salt and a disazo compound having the general formula $R'-N=N-R-N=N-R''$ where R is a phenyl residue, a diphenyl residue or a diphenyl methane residue, where $R'$ is an alkoxy aromatic amine and $R''$ is a hydroxy carboxylic acid or an hydroxy carboxylate.

8. An antiseptic comprising ortho-hydroxyquinoline sulfate and a disazo compound having the general formula $R'-N=N-R-N=N-R''$ where R is a phenyl residue, $R'$ is an aromatic diamine or an alkoxy aromatic amine, and $R''$ is an amino or hydroxy carboxylic acid or an amino or hydroxy carboxylate.

9. An antiseptic comprising ortho-hydroxyquinoline sulfate and the sodium salt of diphenyl-disazo-ortho-ethoxy-aminophenol-ortho-aminobenzoic acid.

10. An antiseptic consisting of equal parts of ortho-hydroxy-quinoline sulfate and the sodium salt of diphenyl-disazo-ortho-ethoxy-aminophenol-ortho-aminobenzoic acid.

11. A mixture of an ortho-hydroxy-quinoline salt and a disazo antiseptic compound in which the end components are at least di-substituted and of which one end component is the nucleus of an aromatic amine of the benzene series and the other end component is the nucleus of a carboxylic acid of the benzene series and in which the benzoic acid component is further substituted by a substituent from the group consisting of amino and hydroxy, and the other end component contains at least one additional substituent from the group consisting of amino and alkoxy.

JOSEPH EBERT.